UNITED STATES PATENT OFFICE.

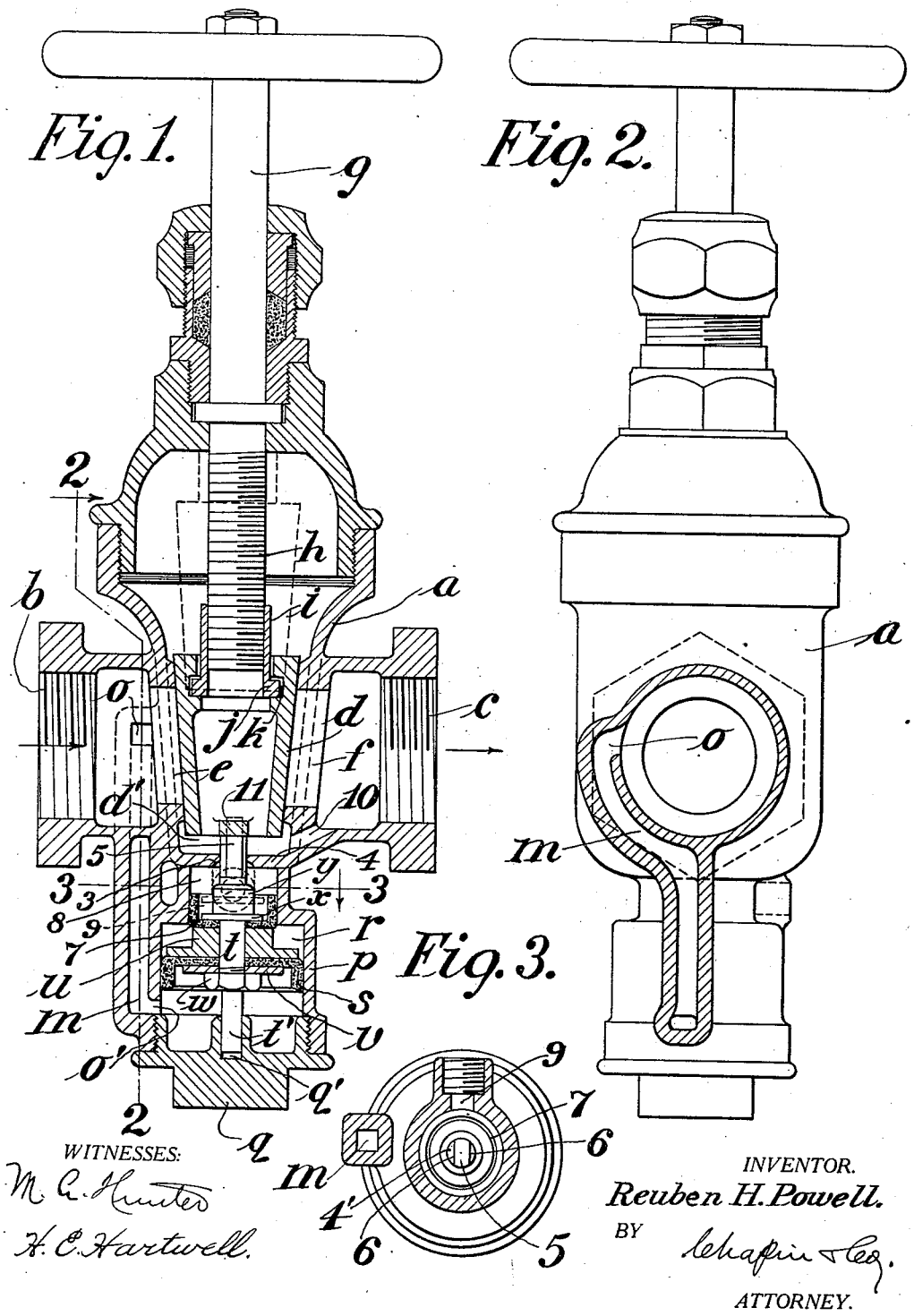

REUBEN H. POWELL, OF WARREN, CONNECTICUT.

STOP AND WASTE VALVE.

1,098,168.  Specification of Letters Patent.  Patented May 26, 1914.

Application filed May 1, 1913. Serial No. 764,811.

*To all whom it may concern:*

Be it known that I, REUBEN H. POWELL, a citizen of the United States of America, residing at Warren, in the county of Worcester and State of Connecticut, have invented new and useful Improvements in Stop and Waste Valves, of which the following is a specification.

This invention relates to improvements in valves and is particularly designed as an improvement in what is known as "stop-and-waste" valves, in which, when the flow of the liquid is shut off, the water in the pipes will automatically drain back, leaving the pipes empty beyond the point of the shut-off.

The invention, broadly, consists in forming a passageway for the water on the pressure side of the valve, and this passageway extends to a chamber in which is located a piston that is connected with a second piston which controls the waste valve on the shut-off side of the main valve, whereby when the valve proper is closed this waste valve is open, and when the valve is open the waste valve is closed; the pressure of the fluid itself serving to automatically operate the waste valve to close the same when the valve is open, and the main valve proper serving to open the waste valve during the closing operation.

Referring to the drawings,—Figure 1 is a vertical sectional view through the axis of the valve-stem and through the axis of the pipe connections showing the main valve proper, the passageway by means of which the fluid can enter the piston-chamber to operate the waste valve; also showing the opening to permit the water to drain out of the pipes when the waste valve is open. The dotted lines indicate the position of the parts when the main valve is open and the waste valve closed. Fig. 2 is a sectional view on the line 2—2 of Fig. 1, clearly showing the passage to permit the fluid to flow from the pressure side of the valve into the chamber, which contains the piston that operates the waste valve when the main valve is open. Fig. 3 is a sectional plan view on the line 3—3 of Fig. 1, showing the location of the waste or drip opening, the waste valve for controlling this opening, and the passage leading from the pressure side of the valve to and below the piston which controls the waste valve, the passage being shown in cross-section.

Referring to the drawings in detail,—$a$ designates the body portion of the valve that is formed with the usual threaded pipe connections $b$ and $c$. The valve proper is shown closed at $d$ and open in dotted lines at $i'$, and comprises, in general, a wedge-shaped member the faces of which engage the faces of the openings $e$ and $f$. The valve-stem is indicated at $g$ and has a threaded portion $h$ which engages an internally-threaded sleeve $i$ that is connected to the valve $d$ by means of the rib-portion $j$ and a channel $k$. Formed in the body-portion $a$ of the valve is a passageway $m$ which opens into the pressure side of the valve, as shown at $o$. This passageway extends downward substantially parallel with the axis of the valve-stem and leads to and terminates at the bottom of a downwardly-extending portion $p$ of the main valve casing. This extension-portion is closed by a cap $q$ having a threaded connection therewith. Formed in the extension-member $p$ is a chamber $r$. Located in this chamber is a piston packing $s$ that is attached to the valve-stem $t$. This stem passes through a backing or filling member $u$ and a washer $v$.

$w$ is a nut for forcing the washer $v$ toward the backing-member $u$ for securely clamping the piston packing $s$ therebetween. The upper end of the stem $t$ is formed with a disk-shaped member $x$, and extending above this disk-portion is the waste valve $y$ which engages the shoulder 3 of the base part 4 of the valve. Formed in the base part 4 is an opening 4' through which passes an extension of the valve-stem $t$. This extension is designated by the numeral 5 and, as shown in Fig. 3, its opposite side is cut away as indicated at 6. Clamped between the member $u$ and the part $x$ is a piston packing member 7 that operates in the chamber 8 of the extension-member $p$. The chamber 8 is formed with an outlet or drip opening 9 that communicates with the opening 4', which latter opening leads into the space $d'$ below the valve $d$, and this space communicates with the outlet side of the valve by means of the passageway 10. This passageway is to permit the water to flow from the pipes or to drain therefrom when the main valve $d$ is closed. It should be noticed that the projection 5 of the valve-stem lies directly below a transverse bar-member 11 that is located in the bottom part of the valve $d$. This bar-member engages the upper end of the stem 5 when the main valve is closed or in its lowest position and thereby forces the waste valve *y* away from the seat 3, thus opening the passageway 4' when the main valve is closed, and permitting the fluid to drain from the pipes through the opening 10, the opening 4', and escape through the waste opening 9.

When the main valve is open, the water enters by the opening *o* and flows through the vertically-arranged passage *m* to and below the piston packing *s*, causing the waste valve *y* to be forced upward against the seat 3, thus shutting off the waste outlet 9. The passage *m* has an outlet opening *o'* immediately below the piston packing *s*. It should be observed that the inlet or opening *o* to the passage *m* is located on a line with the center of the pipe connection *b*. The purpose of elevating this opening is to prevent any foreign substances from gaining access to the passage *m*. The cap *q* is formed with a recess opening *q'* which receives the depending stem *t'* and serves as a guide to the movements of the stem.

It will be seen that the present construction comprises a stop-and-waste valve that is hydraulically operated by means of the pressure of the fluid to close the same when the main valve is open and that this waste valve is positively opened by the main valve during the closing of the same, whereby the waste water from the pipes can readily escape as already described.

What I claim, is,—

1. In a stop-and-waste valve, the combination with the body-portion thereof and the valve proper, of a depending portion formed integral with the body of the valve, the base part of the valve having an opening therein arranged in line with the axis of the valve stem, a waste valve to close said opening and located in the depending portion, a passageway forming a communication with the high-pressure side of the valve and the interior of the depending portion, a piston located in the depending portion, the body-portion of the valve having a passageway on the low-pressure side and communicating with the opening in the base part of the valve, whereby when the main valve is open the waste valve will be closed, and means on the main valve to open the waste valve when the main valve is closed, whereby when the main valve is closed the waste water can drain from the pipes through the waste outlet opening.

2. A hydraulically-operated stop-and-waste valve, comprising a body-portion having a depending extension portion, a main valve or shut-off, a waste valve, a piston in said portion to move the waste valve and operated by the fluid to close the same, the body and extension portions being in communication with each other by means of a laterally located passageway extending from the high pressure side of the main to and below the piston to permit the fluid to gain access to the piston to elevate the same, the waste valve being operated by the main valve when the latter is closed to open the former, there being suitable openings in the valve casing to permit the fluid on the low-pressure side to escape.

3. In a stop and waste valve, the combination with the casing thereof, and the main shut-off valve, a waste valve located in a depending portion of the casing and a passageway between the high pressure side of the valve and the depending portion to afford access to the lower side of the waste-valve to close the same when the main valve is opened, and means on the main valve to open the waste valve when the main valve is closed, there being a passage-way from the low pressure side of main valve and a drip opening in the depending portion to allow the pipe to drain off as described.

4. A stop and waste construction for a straight-way or plug valve, the combination with the casing of said valve, a main valve therein, a depending portion integral with the casing, two pistons in said portion, the casing and depending portion having a passageway leading from the high-pressure side of the valve, to, and below one of the pistons to move the same upward when the main valve is open, a waste valve carried by the second piston to close a waste opening in the lower central part of the casing and which opening communicates with a passageway on the low-pressure side of the valve, a projection on the waste valve and in line with the axis of the valve stem and adapted to be moved downward by the main valve when the same is closed for opening the waste-valve, and the water pressure serving to move the first piston to close the waste-valve when the main valve is open, as described.

REUBEN H. POWELL.

Witnesses:
HARRY W. BOWEN,
HENRY A. BOOTH.